United States Patent [19]

Hogenkamp et al.

[11] 4,282,964
[45] Aug. 11, 1981

[54] ARTICLE TRANSFER DEVICE

[75] Inventors: Wilhelm Hogenkamp, Hanover; Gert Wostbrock, Garbsen, both of Fed. Rep. of Germany

[73] Assignee: Otto Hansel GmbH, Fed. Rep. of Germany

[21] Appl. No.: 58,196

[22] Filed: Jul. 17, 1979

[30] Foreign Application Priority Data

Jul. 17, 1978 [DE] Fed. Rep. of Germany ....... 2831323

[51] Int. Cl.³ ...................... B65G 47/26; B65G 47/64
[52] U.S. Cl. .................................... 198/358; 198/369; 198/433; 198/592; 198/750
[58] Field of Search ............... 198/356, 358, 369, 456, 198/457, 433, 436, 437, 592, 750, 751

[56] References Cited

U.S. PATENT DOCUMENTS

| 3,429,416 | 2/1969 | Provost et al. | 198/433 |
| 3,605,982 | 9/1971 | Adler | 198/358 |
| 3,648,820 | 3/1972 | Schafer et al. | 198/433 X |
| 3,884,343 | 5/1975 | Stephens et al. | 198/433 |
| 4,130,193 | 12/1978 | Bourgeois | 198/369 |
| 4,166,525 | 9/1979 | Bruno | 198/459 X |

FOREIGN PATENT DOCUMENTS

| 268144 | 1/1969 | Austria | 198/592 |
| 2601833 | 7/1977 | Fed. Rep. of Germany | 198/369 |

*Primary Examiner*—James L. Rowland
*Attorney, Agent, or Firm*—Miller & Prestia

[57] ABSTRACT

A device for transferring articles arriving in transverse rows on a feed conveyor, especially confectionery goods, such as chocolate bars or wafers, pralines, etc., to at least two processing sites. The transfer device includes a transfer belt pivotably mounted for alignment with the plane of a delivery belt and the plane of a removal belt, and thereby transfers articles between the two belts. The removal belt is at a level different from that of the delivery belt.

5 Claims, 2 Drawing Figures

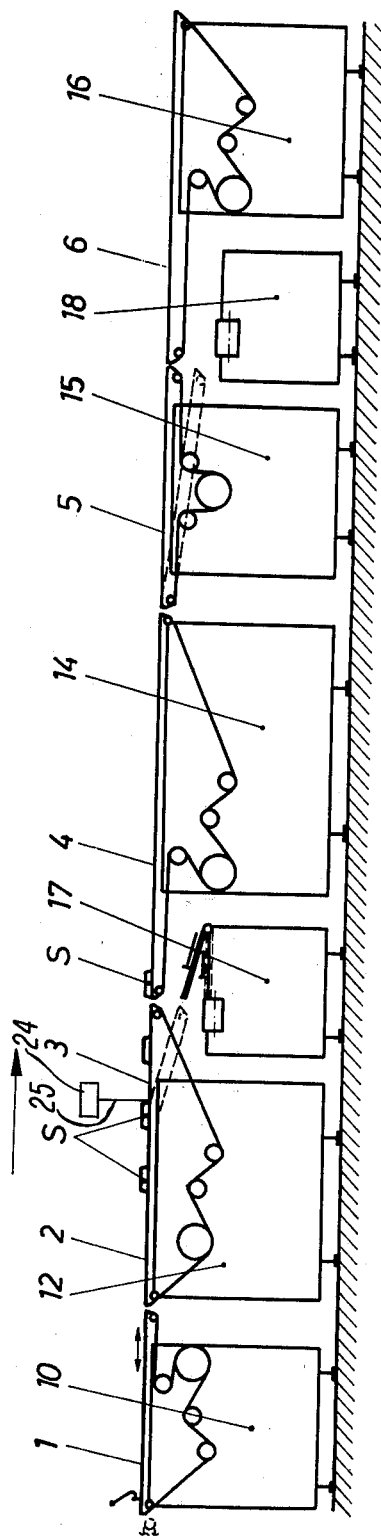
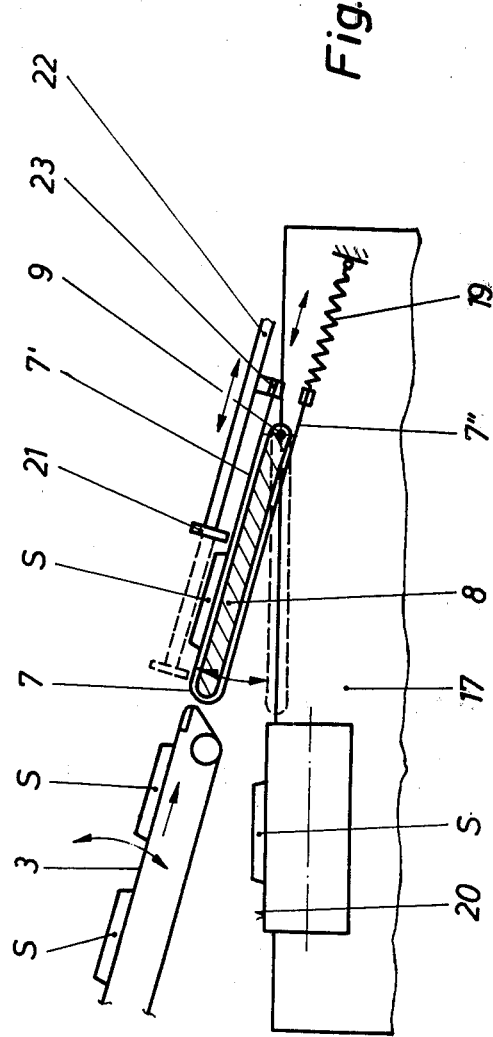

ARTICLE TRANSFER DEVICE

BACKGROUND OF THE INVENTION

The present invention pertains to a device for transferring articles arriving on a circulating endless delivery belt in transverse rows, especially confectionery goods, such as chocolate bars or wafers, pralines, etc., to at least two processing sites.

Transport systems of the type where a delivery belt is followed by a continuous transport belt operating at the same height and in the same direction, have been known. Typically, the delivery belt has a beak at its end which can be pivoted downward for conveying arriving objects to a removal belt arranged at a lower level. Also, feelers are provided which control the pivoting of the beak as a function of the objects arriving on the delivery belt. However, systems of this type have the disadvantage of taking up a large amount of space because of their complex structure. The large space occupied by such a transport system greatly interferes with the setting up of the system in a manufacturing area. In order to transfer the parts arriving on the delivery belt to the removal belt, it is necessary to provide a frame, carriage or the like which is movable in the direction of the feed belt. Furthermore, controlling such a system requires a multiple-controlled, complicated drive system.

The goal of the present invention is to simplify such transport systems and create a transfer device capable of being produced with low construction complexity, and simply converted at any time to the respective operating conditions.

In accordance with the present invention, this is achieved by providing a transfer belt of variable positions between the beak of the delivery belt, in its lower pivot position, and the removal belt. The transfer belt on its side facing away from the transfer site is pivotable back and forth around an axis lying in the plane of the removal belt between the delivery plane of the downward-pivoted beak and the delivery plane of the removal belt. Thus, the transfer belt with the aid of feelers, can take off certain transverse rows of articles from the delivery belt with its beak pivoted downward, and transfer them to the removal belt.

The transfer belt of the present invention includes a U-shaped transport cloth placed around a belt holder supported so as to be pivotable at one end. The belt holder is provided on one end with a tensile spring and on the other end with a stop, movable back and forth within the belt plane and in the transport direction. A drive is provided with the stop and the belt holder. In the transfer position of the upwardly pivoted belt holder, the spring pulls back the stop, which acts as a counter-holder for the articles, and the transport cloth is pulled against the spring action at a speed equal to that of the delivery belt. After the transfer belt receives the articles, the spring tension makes the stop and the transport cloth stand still in order to pivot the belt holder in the transfer position which is downward into the plane of the removal belt. Thereafter, the spring tension causes the stop to move forward and function as a pusher for transferring the articles to the removal belt.

However, it is also possible to form the transfer belt from an endless belt with a reversible drive. The transfer belt travels over the belt holder, supported on one side, and can be pivoted back and forth between the take-off side and the release side. The transport belt in accordance with the present invention is included in the feeler control loop of the overall control system, and operates synchronously with the feed belt.

It is also possible to design a system in accordance with the present invention in such a manner that the removal belt operates above the plane of the feed belt, and correspondingly the pivotable beaks of the feed belt are pivotable upward and the transfer belt with its drive is correspondingly arranged above the plane of the feed belt or transfer belt.

The device in accordance with the invention has a further advantage in that the transfer belt with its drive and the necessary control devices forms an independent system which can be connected into a break in a conveyor transport line. The present invention allows for placement of the transfer device at the point of delivery of the articles at the appropriate sites where further processing require it.

The concept of the invention permits a great variety of embodiments. One of these is shown in the attached drawings, as follows:

FIG. 1 is a schematic drawing of the side view of a conveyor transport system incorporating the present invention.

FIG. 2 is an enlarged schematic drawing representing the transfer device of the present invention.

DESCRIPTION OF THE INVENTION

Depending on the operating conditions, the transport system incorporating the present invention may consist of a preliminary switching belt 1, onto which are delivered, in successive transverse rows, finished articles, such as confectionery goods, for example, chocolate bars or wafers, pralines, etc.

Depending on operating conditions, the preliminary switching belt 1 may have the capability to move back and forth, in the directions shown by the arrow, in order to pull the rows of articles apart or bring them closer together. The preliminary belt 1 is advantageously carried in a movable carriage 10, together with its guides, control elements and the drive. The preliminary switching belt 1 is followed by the delivery belt 2, which along with its guide and drive rollers is supported in the movable machine frame 12. The delivery belt 2 at its end farthest from belt 1 is in the form of a beak 3, upwardly and downwardly pivotable as indicated by the broken lines. Depending on the pivoted position of the beak 3, the articles S thereon can be transferred to a transmission belt 4 operating at the same level as belt 2, or the articles S can be conveyed to a transfer device, subsequently described, operating at a lower level, and advantageously formed from the independent system designated as 17.

The transfer belt 4, having a drive in the machine frame 14, conveys the articles S forward after further processing (not illustrated in detail), e.g., a packaging machine or stacker. However, a reverse belt 5 may be provided after the transfer belt 4. Reverse belt 5 is downwardly pivotable and has its drive in a separate machine frame 15. Finally, a storage belt 6, on a carriage 16, follows the belt 5. Storage belt 6 carries excess items or those which cannot presently be handled by the packaging machine to a stacking area.

The system 18 is similar to the system 17, and is likewise positioned in a break between two conveyor belts of the transport line. The system 17 transfers articles S arriving on removal belt 20 from the downwardly pivoted beak 3 of the delivery belt 2. Removal belt 20 operates beneath the transport plane of the feed belt 2 transverse to its transport direction.

The arrangement of the removal belt 20 and the transfer device in accordance with the present invention is such that in each case the articles S arriving in successive transverse rows are removed by row to the removal belt 20, wherein the transverse rows of articles S, to be successively transferred, are arranged successively in the direction of the rows. Thus, the articles S can, for example, be packaged individually and successively in the packaging machine following the removal belt 20.

The beak 3 of the feed belt 2 can be downwardly pivoted into the position as shown in FIG. 2 by control means 24, feelers 25, etc. In this downward-swung position the feed belt 2 or its beak 3 is followed by the transfer belt 7, which is carried on a belt holder 8. The belt holder 8 is upwardly and downwardly pivotable around an axis designated as 9, and it is controlled by feelers 25 and control means 24 therefore so as to be in a return position when the articles S, i.e., the articles S to be conveyed over the transfer belt 7 to the removal belt 20, arrive on the downwardly-positioned beak 3 of the feed belt 2.

The transfer belt 7 can be an endless intermittent transport belt, moving back and forth, which is correspondingly connected with its drive or, as shown in the embodiment of FIG. 2, it can be a U-shaped transport cloth placed around the belt carrier 8. Transport cloth belt 7 is connected at its upper end 7' to a carrier 22 of a stop 21. The other end, designated as 7'', of the transport cloth belt 7 is on the other hand connected to a tension spring 19, which holds the transport cloth tightly over the belt carrier 8.

The mode of operation of this transfer device 17 is subsequently described:

As soon as the beak 3 of the feed belt 2 is pivoted downward into the position as shown in FIG. 2 and articles S arrive in the direction of the arrow, the belt holder 8 is located in its turned-up position and at the same instant the stop 21, with its carrier 22, is positioned in its farthermost position, as shown by the broken lines in FIG. 2. The transfer belt 7 at this time is pulled far back by the force of spring 19. As soon as the articles S pass from the beak 3, they make contact with belt 7 and reach the area of stop 21. The stop 21 acts as a counterholder upon contacting the articles S, which if necessary aligns the adjacent articles S. It then moves immediately backwards with the transverse row of articles S into its rearward position, shown by the heavy lines. This movement is also performed by the transport cloth 7 against the action of the spring 19. As soon as the transfer has taken place, the belt holder 8 pivots into its horizontal position (shown by the broken lines) and is in the same plane as the removal belt 20. Next, the holder 22 with the stop 21 moves back to the front, whereby the articles S are transferred by the transport cloth belt 7 to the removal belt 20. This is done very gently, since in each case the transport cloth belt 7 also makes the same movement as the stop 21. This gentle transfer prevents damage to the articles S. The articles S cannot slip on the belt 7 during transfer and thus do not become scratched, as was the case with previously known systems. At the time of advance of the stop 21, which operates as a separator during the transfer of the articles S to the removal belt 20, the transport cloth belt 7 is likewise moved along, corresponding to the direction of movement of the stop holder 22 and the tension on the spring 19.

As soon as the transfer is completed, the belt holder 8 is returned to its upward or ready position for acceptance of additional articles S from the beak 3. Depending on the connection of the drive, one or more transverse rows can simultaneously be taken up by the beak 3 and transferred to the removal belt 20.

Particularly advantageous of the system of the present invention is its acceptance and transfer of individual rows, thus a single row of successive articles is transferred onto the removal belt 20, as is necessary for further processing, especially in the case of individual packaging. If on the other hand, articles S are to be transferred to the other processing site connected to the system, this takes place at the appropriate time by swinging the beak 3 up to the height of the transfer belt 4, onto which the articles S are then transferred in a known manner.

Particularly advantageous to the present invention is the subdivision, shown in FIG. 1, of the entire transport section into individual, arbitrarily successively connected systems, since in this manner the possibility exists of adapting the transport section with its various transfer sites and removal belts to the location of the respective packaging machine.

We claim:

1. A device for transferring articles arriving in transverse rows on a circulating endless delivery belt, to at least two processing sites, wherein a delivery belt is followed by a continuous conveyor belt at the same plane and operating in the same direction as the delivery belt, the delivery belt has at its end a downwardly pivotable beak, by way of which arriving articles can be brought to a removal belt positioned at a lower level than the delivery belt and feelers are provided which control the pivoting of the beak as a function of the articles arriving on the delivery belt, characterized in that a transfer belt is adapted for pivotal movement at one end thereof and about an axis in the plane of said removal belt, said transfer belt further adapted for up and down pivotable movement so as to lie either in the plane of said removal belt or the plane of the beak of said delivery belt upon said beak being in its lowest downwardly pivoted position to thereby transfer articles in transverse rows from said delivery belt to said transfer belt.

2. The transfer device in accordance with claim 1, wherein the transfer belt comprises a U-shaped transport cloth passing around a belt holder supported pivotably on one side, said tension means being a spring which makes the stop with the transport cloth stand still in order to swing the belt holder into the transfer position down into the plane of the removal belt, and thereafter said spring causes the stop member to move forward along with the movement of the transport cloth and thereby serves as a pusher for transferring articles onto said removal belt.

3. The transfer device according to claim 1, wherein the transfer belt is an endless conveyor belt provided with a reversing drive, which travels over a belt holder, supported on one side, which can be swung back and forth between the transfer position and the release position.

4. The transfer device according to claim 1, wherein the transport belt is included in the feeler control loop of the overall transport system and operates synchronously with the belt speed of the delivery belt.

5. The transfer device according to claim 1, characterized in that the transport belt with its drive and control devices forms an independent system which can be inserted into a break in transport line.

* * * * *